US007171290B2

(12) United States Patent
Lagadec et al.

(10) Patent No.: US 7,171,290 B2
(45) Date of Patent: Jan. 30, 2007

(54) METHOD AND DEVICE FOR CONTROLLING SATELLITE ATTITUDE AND STEERING USING A GYRODYNE CLUSTER

(75) Inventors: Kristen Lagadec, Toulouse (FR); Ange Defendini, Montjoire (FR); Julien Morand, Balma (FR)

(73) Assignee: EADS Astrium SAS, Velizy Villacoublay (FR)

( * ) Notice: Subject to any disclaimer, the term of this patent is extended or adjusted under 35 U.S.C. 154(b) by 404 days.

(21) Appl. No.: 10/482,031

(22) PCT Filed: Jun. 24, 2002

(86) PCT No.: PCT/FR02/02181

§ 371 (c)(1),
(2), (4) Date: Dec. 29, 2003

(87) PCT Pub. No.: WO03/001311

PCT Pub. Date: Jan. 3, 2003

(65) Prior Publication Data

US 2004/0167683 A1   Aug. 26, 2004

(30) Foreign Application Priority Data

Jun. 26, 2001   (FR)   .................................. 01 08409

(51) Int. Cl.
*G05D 1/08*   (2006.01)
*G06F 17/16*   (2006.01)
(52) U.S. Cl. ........................................ 701/13; 244/164
(58) Field of Classification Search ...................... None
See application file for complete search history.

(56) References Cited

U.S. PATENT DOCUMENTS 3,741,500 A  *  6/1973  Liden .......................... 244/165
6,131,056 A     10/2000  Bailey et al.
6,305,647 B1    10/2001  Defendini et al.
6,682,019 B2 *  1/2004  Bailey ......................... 244/164

FOREIGN PATENT DOCUMENTS

FR        2 773 775        1/1998

OTHER PUBLICATIONS

Lagadec et al; "Low Cost CMG-Based AOCS Designs"; XP-008003434; Proceedings 4th ESA International Conference on Spacecraft Guidance, Navigation and Control Systems, ESTEC; Oct. 18-21, 1999; pp. 393-398.

* cited by examiner

*Primary Examiner*—Michael J. Zanelli
(74) *Attorney, Agent, or Firm*—Stites & Harbison PLLC; Ross F. Hunt, Jr.

(57) ABSTRACT

In order to control the attitude of a satellite having at least four gyroscopic actuators with respective spinners mounted on gimbals steerable about axes parallel to one or the other of only two different directions that are fixed relative to the satellite, the attitude of the satellite is measured using sensors on board the satellite, the control torque required to perform an attitude-changing maneuver is calculated, local linearization calculation is performed based on pseudo-inversion of the Jacobean matrix of the function associating the orientations of the actuator gimbals with the total angular momentum of the cluster in order to determine a new gimbal orientation, and precession speeds of at least one of the gimbals of the actuators are controlled to deliver the control torque for reaching the desired configuration.

12 Claims, 2 Drawing Sheets

METHOD AND DEVICE FOR CONTROLLING SATELLITE ATTITUDE AND STEERING USING A GYRODYNE CLUSTER

FIELD OF THE INVENTION

The present invention relates to methods and apparatuses enabling the attitude of a satellite to be controlled by controlling the orientation of the axis of rotation of the spinners of gyroscopic actuators or "gyrodynes" in a cluster of gyroscopic actuators mounted in the satellite.

BACKGROUND OF THE INVENTION

Gyrodynes or gyroscopic actuators (also known as "control moment gyros" (CMG)) have a wheel or "spinner" mounted on a support referred to as "gimbals" and steerable on the platform of the satellite by a motor to turn about at least one axis that is orthogonal to the axis of rotation of the spinner. An example of a gyrodyne is described in French patent application No. 98/00556, to which reference can be made.

In order to make it possible to bring a three-dimensional frame of reference associated with the satellite into any attitude a cluster of gyrodynes comprises at least three gyrodynes, or for control about two axes it comprises at least two gyrodynes. In general, at least four gyrodynes are used to provide redundancy.

The gyrodyne cluster constitutes an inertial actuator which can be controlled to apply a torque imparting an angular speed profile to the satellite platform as specified by uploading from the ground or by performing calculations on board.

In order to control the attitude, a control system determines the torque to be applied and deduces therefrom a speed that should be applied to the gimbals of the gyrodynes. The ability to deliver a total torque C is consequently not steady and non-linear. It can be written in matrix form:

$$C = A(\sigma) \cdot \dot{\sigma} \quad (1)$$

where A is the Jacobean matrix $a_{ij=\partial H_i/\partial \sigma_j}$, with i=1 to 3 and j=1 to 4 (or more generally taking all values from 1 to the number of gyrodynes). Starting from the torque C to be delivered, a conventional steering method consists in inverting equation (1) to obtain the reference speeds c to be given to the gyrodynes. The principle of such control is given, for example, in the above-mentioned French patent application or in U.S. Pat. No. 6,131,056.

French patent application No. 98/14548, to which reference may be made, describes and claims a method of controlling the attitude of a satellite enabling the problem of singularities to be avoided, i.e. avoiding entering into configurations in which it is impossible to obtain torque in a determined direction, by controlling a direct passage from an initial configuration to a final configuration.

For this purpose, the architecture described in patent application Ser. No. 98/14548 comprises a cluster of at least four gyrodynes having respective spinners mounted on respective gimbals, themselves mounted to turn relative to the satellite platform about gimbal orientation axes that are all different.

That configuration presents the advantage in principle of having maximum isotropy when the four gimbal axes are directed along the diagonals of a cube. When it is desired to increase capacity along two orthogonal axes in order to take account of the fact that agility requirements are rarely isotropic, it suffices to flatten the pyramid whose edges are orthogonal to the axes of the gimbals. However, as a counterpart to those advantages, the pyramid-shaped architecture presents various drawbacks. The capacity envelope presents concave portions: with a flattened pyramid it is not possible to independently adjust the capacities along the two axes of the pyramid base. The loss of one of the actuators leads to an agility envelope that is very asymmetrical and has a severe effect on agility.

SUMMARY OF THE INVENTION

To overcome these drawbacks, the invention provides for the use of a satellite having a cluster of at least four gyroscopic actuators having respective spinners mounted on gimbals that are steerable about axes that are parallel to one or other of only two different directions that are fixed relative to the satellite, and to adopt an original method of control that makes it possible to avoid entering into singular configurations while controlling attitude.

For this purpose, the invention provides a method of controlling the attitude of such a satellite, the method comprising the steps of:

measuring the attitude of the satellite by means of sensors on board the satellite;

calculating the control torque required to perform a determined attitude-changing maneuver;

calculating local linearization based on pseudo-inversion of the Jacobean matrix of the function associating the orientations of the actuator gimbals with the total angular momentum of the cluster in order to determine new orientations for the gimbals; and commanding precession speeds of at least one of the actuator gimbals delivering the control torque for achieving the desired configuration;

the method being characterized by the step of performing the calculation of the new orientations by applying a constraint of seeking a cluster configuration remote from singular configurations by sharing between the two groups of actuators that component of the total angular momentum of the cluster which is perpendicular to both of said two directions.

In an advantageous implementation, the criterion adopted for the remoteness of a configuration of the angles of the gimbals in the cluster from a singular configuration, is the product of two simpler criteria that apply separately to each of the two groups of actuators.

These two criteria can have a very wide variety of natures:

When one of the groups is constituted by two actuators each carrying a non-dimensional angular momentum of unity norm, the criterion for remoteness between a configuration of gimbal angles and a singular configuration may be selected as:

being zero when the angle between the two angular momentum vectors carried by the two actuators is zero or flat; and reaching a maximum when the angle between the two angular momentum vectors carried by the two actuators is close to 90°.

Searching a final configuration that is remote from singularities can enable a correspondence table to be established between the various angular momentums of the cluster needed for the various maneuvers of the satellite and the associated respective optimum cluster configurations. In a variant, the search for a final configuration remote from singularities leads directly and in analytic manner to an optimum cluster configuration that provides the cluster angular momentum demand needed for maneuvering the satellite.

When a group is constituted by three actuators, each carrying a non-dimensional angular momentum of unity norm, the criterion for remoteness between a configuration of gimbal angles and a singular configuration may be defined in such a manner as to cancel when one of the angles formed between any two of the three angular momentum vectors carried by the three actuators is zero and so as to reach its maximum when said angles are close to 120°.

When control is performed in application of a predetermined time relationship, it is possible to seek a final configuration remote from singularities in continuous manner, continuously deviating the configuration of the cluster so as to be located at all times—or at least periodically—on the local maximum of the criterion for remoteness from the singularity.

In a variant, a search is made for a final configuration that is remote from singularities as soon as it is detected that the remoteness between the current configuration and the associated singularity has dropped below a predetermined threshold.

The search for a final configuration that is remote from the singularities can be implemented in advance, on the basis of prior knowledge concerning the trajectory needed for the angular momentum of the cluster in order to change the orientation of the satellite, and the resulting trajectory is subsequently used as a preferred trajectory, being delivered in an open loop in the context of an attitude control method associating an open loop control with the closed loop control of the above-cited French patent application.

The invention also makes it possible to perform guidance by implementing a memorized relationship. Under such circumstances, prior to performing a steering maneuver, it is advantageous to determine a final configuration that is remote from singularities, given knowledge of the attitude maneuver that is to be performed by the satellite, and then to control attitude by associating an open loop control method with a closed loop control method, as described in French patent application No. FR 98/14548. In other words, the method is implemented in advance on the basis of prior knowledge of the maneuver to be performed, and the satellite attitude maneuver is performed by using the trajectory obtained in an open loop in an attitude control method associating an open loop control with a closed loop control so as to ensure that the satellite reaches the desired final attitude.

The invention also provides an apparatus for controlling attitude enabling the above-described method to be implemented, the apparatus comprising:

a cluster of at least four gyroscopic actuators having respective spinners mounted on gimbals steerable about axes parallel to one or the other of only two different directions and fixed relative to the satellite, thus forming at least two groups of actuators of which one group has at least two actuators each;

sensors for measuring the current attitude of the satellite; and calculation means for calculating the control torque needed to comply with a reference attitude for the satellite, and for determining means for controlling the precession speeds of the gimbals to deliver control torque by means of a local linearization method based on pseudo-inversion of the Jacobean matrix of the function associating the orientations of the actuator gimbals with the cluster angular momentum.

BRIEF DESCRIPTION OF THE DRAWINGS

The above characteristics and others appear more clearly on reading the following description of a particular embodiment of the invention given by way of non-limiting example. The description refers to the accompanying drawings, in which.

DESCRIPTION OF THE PREFERRED EMBODIMENTS

Figure 1:
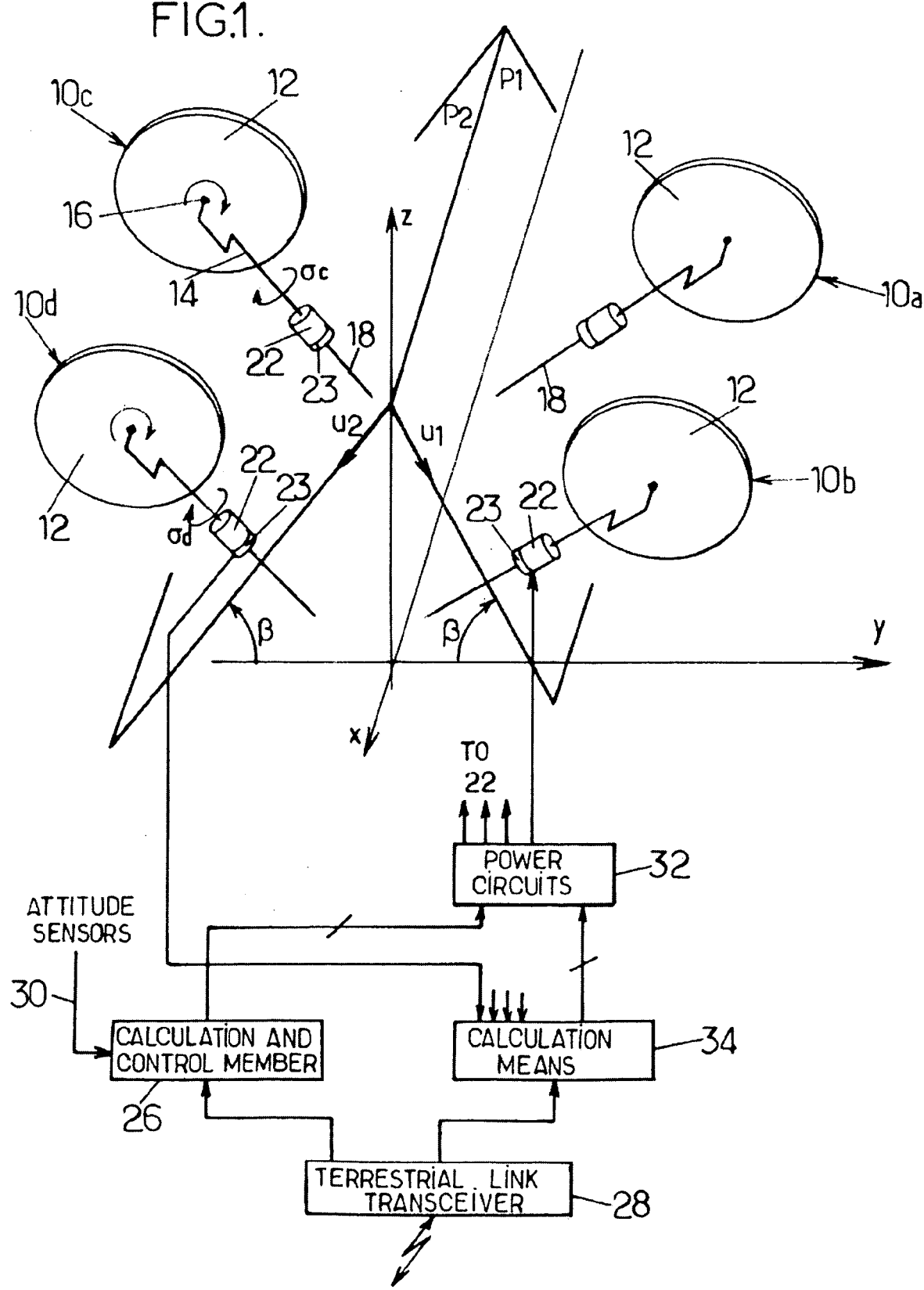
FIG. 1 is a perspective diagram showing one possible disposition for four 1-axis gyroscopic actuators, of a cluster using an advantageous architecture, the actuators being shown with identical gimbal orientations.
Figure 2:
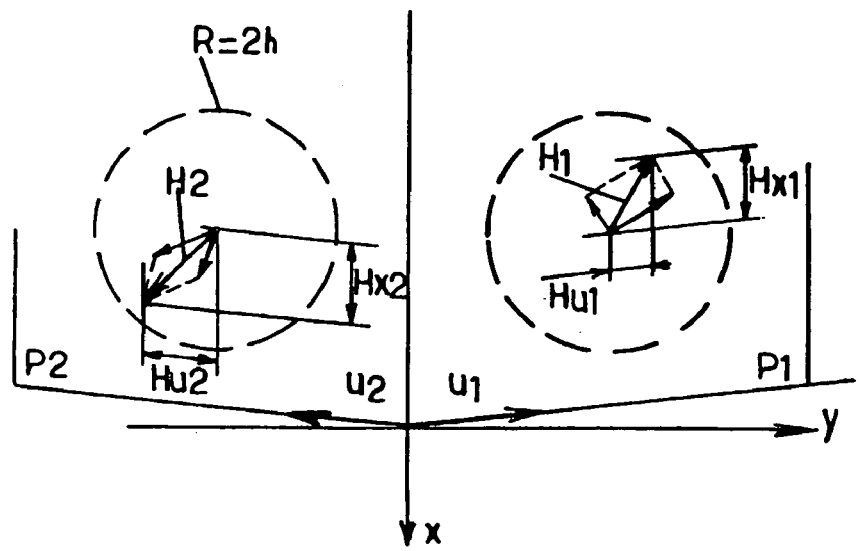
FIG. 2 is a diagram showing the parameters involved in analytic calculation of possible correspondences between the looked-for angular momentum H and the angular positions σ of the gimbals.

FIG. 1 shows a cluster of four identical gyroscopic actuators 10a, 10b, 10c, and 10d, each having a spinner 12 mounted on gimbals 14 so as to be capable of spinning about a respective axis 16. A motor (not shown) serves to keep each spinner spinning, generally at constant speed. Each gimbal is mounted on the platform of the satellite (not shown) so as to be capable of turning about an axis 18 orthogonal to the spin axis 16. Each of the gimbals is provided with a motor 22 enabling the gimbals to be turned about the respective axis 18. An angle sensor such as 23 provides information about the orientation of the gimbals, and thus about the plane of the spinner 12.

The satellite is maintained in a reference attitude in an inertial frame of reference by an attitude control system of a general structure that can be of known type. The system includes a calculation and control member 26 which stores reference orientations received by a terrestrial link transceiver 28 and receives signals 30 coming from orientation sensors such as star sensors and terrestrial horizon sensors. This member 26 controls power circuits 32 powering the motors 22. The time constant of this system is generally relatively long, being a few seconds to several tens of seconds.

In order to implement the invention, the axes 18 have one or the other of only two different orientations.

In the three-dimensional frame of reference x,y,z associated with the satellite, the axes of the gimbals of actuators 10a and 10b are disposed perpendicularly to a common plane P1. The axes of the gimbals of actuators 10c and 10d are likewise parallel to each other and disposed perpendicularly to a plane P2 which intercepts the plane P1 along an axis on or parallel to the x axis. The planes P1 and P2 are both at an angle β with the axis y. The overall angular momentum of the cluster of actuators is designated H below and the components of H in the planes P1 and P2 are designated, respectively, H1 and H2, with u1 and u2 designating the axes perpendicular to x and contained respectively in the planes P1 and P2.

The configuration of actuators shown in FIG. 1 (and any other actuator configuration in which the axes of the gimbals are parallel in pairs) has the advantage of enabling correspondence between the angular momentum H and the angular positions 1, 2, 3, and 4 of the gimbals to be expressed analytically, e.g. being expressed relative to the disposition shown in FIG. 1.

As mentioned above, the method of the invention implies seeking a cluster configuration, i.e. a set of values □, serving simultaneously to deliver the requested cluster angular momentum vector H=[Hx,Hy,Hz], and which is also optimum in the sense that it is remote from a singular configuration.

In order to perform analytical the analysis, the vector H is resolved into:

a component [Hy,Hz] lying in the plane y,z, which is itself resolvable into two components Hu1 and Hu2 along the axes u1 and u2 in one manner only; and a component Hx along the axis x.

The architecture adopted enables the component Hx to be shared between the two pairs of actuators 10a & 10b and 10c & 10d with one degree of freedom, except on the surface of the angular momentum envelope where the component presents a singularity.

The vector H may be resolved into two vectors H1 and H2 as follows:

in the plane P1, defined by [x,u1], H1=Hu1+Hx1; and in the plane P2, defined by [x,u2], H2=Hu2+Hx2.

In each plane, it suffices to steer the gimbals whose axes are perpendicular to this plane to obtain the needed plane component.

For example, the two gimbals of plane P1 are disposed symmetrically on either side of the direction of the angular momentum H1 making an angle 1 with said direction, such that:

2h cos 1=|H1| where h designates the individual scalar angular momentum of each spinner.

In plane P2, the same operation can be performed:

2h cos 2=|H2|

It can be seen that determination is purely analytic and enables four orientation angles to be obtained for the gimbals to deliver the required angular momentum H, within the limit of the maximum value R=2h of the angular momentum of each pair of actuators.

Given that four adjustable angular momentums are available, whereas the angular momentum H to be supplied is in three dimensions, there exists a degree of freedom enabling Hx to be obtained by any combination of the form:

Hx1=λHx

Hx2=[(1−λ)(Hx)]

λ being a weighing coefficient that can be selected at will.

In accordance with the invention, this selection is performed by seeking a cluster configuration that is remote from singular configurations, by adopting one of the above-mentioned criteria.

Consequently, the proposed architecture in combination with the method of the invention enables numerous advantages to be obtained.

The correspondence between the required value H and the various distributions of 1, 2, 3, and 4 can be expressed in purely analytic manner.

It is possible to go from any configuration creating a determined angular momentum H to any other configuration creating the same angular momentum by a permanently zero torque displacement, merely by continuously varying the weighting factor λ. This confirms the absence of elliptical internal singularities for the proposed configuration.

The invention is applicable to various methods of controlling attitude and steering in application of a predetermined relationship to be satisfied over a long period, for example several days.

The control methods and configurations commonly used in the past have required global steering that requires the angular momentum to follow a variation that is determined in advance in order to avoid passing through singularities. Local control (which for reasons of clarity is contrasted with overall control) runs the risk of leading to elliptical singularities from which it is difficult to escape. Overall steering as proposed in the above-mentioned French patent application avoids the problem, but requires prior knowledge of the maneuver to be accomplished.

In the invention, in order to avoid ending up in a singularity, it suffices to add a servo-control loop to the local control by pseudo-inversion of the Jacobean matrix, which servo-control loop serves, at zero torque, to seek the configuration which is as far as possible from a singular configuration. This approach has the additional advantage of guaranteeing that the cluster of actuators is always close to a controllability optimum.

The invention also lends itself to predictive steering based on a local steering algorithm, following a trajectory calculated in advance, stored in memory, and injected into an open loop in the calculation means 34. In particular, it is possible to precalculate a trajectory that is optimal in terms of controllability, making it possible at all times to obtain a specified angular speed profile, or at least to pass via specified speed profiles.

An additional advantage of the configuration is that the geometry remains simple in the event of one of the actuators failing, thus making it possible to conserve a capacity to control attitude while degrading agility to a small extent only (25% about the axis x).

Figure 3:
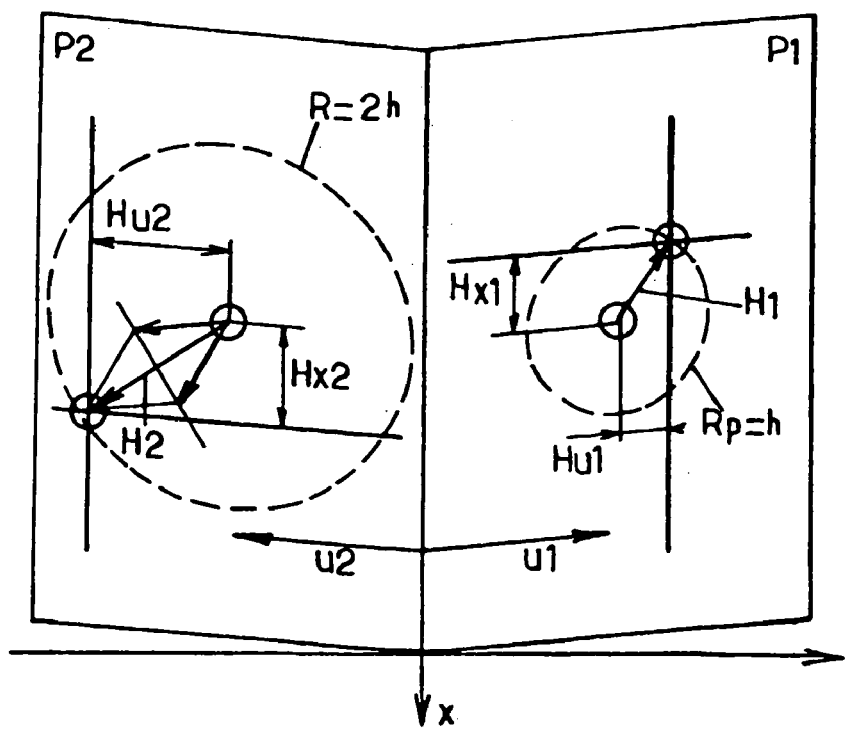
FIG. 3 is a diagram showing the parameters involved in the analytic calculation when redundancy has been lost because an actuator has failed.

For example, if one of the actuators in the plane P1 breaks down, then the system is in the state represented by FIG. 3.

Solving the relationship between the required overall angular momentum and the orientations of the available actuators remains strictly analytic.

The only important consequence is that the working actuator in the plane P1 has an angular orientation that is imposed by the requested angular momentum Hu1, since there is only one way in which H can be resolved along the axes u1 and u2. Naturally, there is no longer the degree of freedom that was provided by having four actuators available.

The capacity to provide control about a zero angular momentum is conserved by the presence of two positions for the remaining actuators ensuring the zero value. These two configurations are not singular and the radius Rp of the neighborhood that is free from singularity is equal to h (FIG. 3).

The loss of agility about the axis x, where capacity is at a maximum, amounts to going from 4h to 3h. Along one of the axes u the maximum loss of agility is 50%. However, very often, the axis having the greatest requirements for agility is the axis x, where degradation is least.

In the above-mentioned circumstance where one of the groups is constituted by two actuators, the criterion for ensuring a configuration of gimbal angles that is remote from a singular configuration can be determined by using one of the following parameters: the norm of the vector product of the two angular momentum vectors carried by the two actuators; the absolute value of the sine of the angle formed by the two angular momentum vectors carried by the two actuators; the area of a triangle having two sides constituted by the angular momentum vectors carried by the two actuators, their origins coinciding; and the difference between unity and the absolute value of the scalar product of the two angular momentum vectors carried by the two actuators.

When the group is constituted by three actuators each carrying a non-dimensional angular momentum of unit norm, the remoteness between a configuration of gimbal angles and a singular configuration can be determined in particular by using one of the following parameters: the sum of the three vector products between pairs of angular momentum vectors carried by the three actuators and the area of the triangle whose vertices coincide with the vertices of the angular momentum vectors carried by the three actuators, their origins coinciding.

The invention claimed is:

1. A method of controlling the attitude of a satellite having a cluster of at least four gyroscopic actuators with respective spinners mounted on gimbals steerable about axes parallel to one or the other of only two different directions that are fixed relative to the satellite so as to form at least two groups of actuators of which one group has at least two actuators, the method comprising the steps of:
    measuring the attitude of said satellite by means of sensors on board said satellite;
    calculating a control torque required to perform an attitude-changing maneuver;
    calculating local linearization based on pseudo-inversion of the Jacobean matrix of the function associating the orientations of said actuator gimbals with the total angular momentum of said cluster in order to determine new orientations for said gimbals; and
    commanding precession speeds of at least one of said actuator gimbals so as to deliver said control torque for achieving the desired configuration;
    wherein the step of determining said new orientations is performed by applying a constraint of seeking a cluster configuration remote from singular configurations by sharing between said two groups of actuators that component of said total angular momentum of said cluster which is perpendicular to both of said two directions.

2. The method according to claim 1, comprising a step of adopting, as a criterion for remoteness between a configuration of the angles of said gimbals in said cluster and a singular configuration, the product of two simpler criteria that apply separately to each of said two groups of actuators.

3. The method according to claim 2, wherein for a group constituted by two actuators each carrying a non-dimensional angular momentum of unity norm, said criterion for remoteness between a configuration of gimbal angles and a singular configuration is selected as:
    being zero when the angle between the two angular momentum vectors carried by said two actuators is zero or flat; and
    reaching a maximum when the angle between the two angular momentum vectors carried by said two actuators is close to 90°.

4. The method according to claim 3, wherein said criterion for remoteness between a configuration of gimbal angles and a singular configuration is determined by using one of the following parameters:
    the norm of the vector product of two angular momentum vectors carried by said two actuators;
    the absolute value of the sine of the angle formed between the two angular momentum vectors carried by said two actuators;
    the area of a triangle having two sides constituted by the angular momentum vectors carried by said two actuators, their origins coinciding; and
    the difference between unity and the absolute value of the scalar product of the two angular momentum vectors carried by said two actuators.

5. The method according to claim 2, wherein, for a group of actuators being constituted by three actuators each carrying a non-dimensional angular momentum of unity norm, said criterion for remoteness between a configuration of gimbal angles and a singular configuration is defined in such a manner as to cancel when one of the angles formed between any two of the three angular momentum vectors carried by said three actuators is zero and so as to reach its maximum when said angles are close to 120°.

6. The method according to claim 5, wherein said criterion for remoteness between a configuration of gimbal angles and a singular configuration is determined by using one of the following parameters:
    the sum of the three vector products between pairs of the angular momentum vectors carried by said three actuators; and
    the area of a triangle whose vertices coincide with the vertices of the angular momentum vectors carried by said three actuators, their origins coinciding.

7. The method according to claim 1 for controlling said satellite in application of a relationship that is determined over time, wherein a final configuration remote from singular configurations is sought continuously by permanently deflecting the cluster configuration so as to occupy the local maximum of a criterion for remoteness between a configuration of gimbal angles and a singular configuration.

8. The method according to claim 1, wherein a final configuration remote from singular configurations is sought when it is detected that the remoteness between the current configuration and an associated singular configuration has dropped below a predetermined threshold.

9. The method according to claim 1, wherein, in order to perform a determined attitude maneuver reaching a final configuration that is remote from singular configurations, attitude is controlled by associating open loop control with closed loop control.

10. The method according to claim 9, wherein prior calculation is used to establish a correspondence table between various cluster angular momentums needed for various satellite maneuvers and respective associated optimum cluster configurations so as to reach a final configuration that is remote from singular configurations.

11. The method according to claim 9, wherein the search for a final configuration remote from singular configurations provides directly and in analytic manner an optimum cluster configuration delivering the requested cluster angular momentum needed for maneuvering said satellite.

12. The method according to claim 7, which is implemented in advance on the basis of prior knowledge of a maneuver that is to be performed, and wherein the satellite attitude maneuver is performed by using a resulting trajectory in an open loop in attitude control associating an open loop control with a closed loop control for bringing said satellite into the desired final attitude.

* * * * *